(12) United States Patent
Teetzel

(10) Patent No.: US 10,956,803 B2
(45) Date of Patent: Mar. 23, 2021

(54) MODULAR ROCKET RESCUE SYSTEM AND PASSENGER SAFETY WEARABLE BAND

(71) Applicant: Wilcox Industries Corp., Newington, NH (US)

(72) Inventor: James W. Teetzel, Portsmouth, NH (US)

(73) Assignee: Wilcox Industries Corp., Newington, NH (US)

( * ) Notice: Subject to any disclaimer, the term of this patent is extended or adjusted under 35 U.S.C. 154(b) by 0 days.

(21) Appl. No.: 15/943,232

(22) Filed: Apr. 2, 2018

(65) Prior Publication Data
US 2018/0285710 A1 Oct. 4, 2018

Related U.S. Application Data

(60) Provisional application No. 62/480,761, filed on Apr. 3, 2017.

(51) Int. Cl.
*B63C 9/22* (2006.01)
*G06K 19/077* (2006.01)
(Continued)

(52) U.S. Cl.
CPC ...... *G06K 19/07762* (2013.01); *A44C 5/0007* (2013.01); *B63C 9/01* (2013.01); *B63C 9/22* (2013.01); *F41G 7/008* (2013.01); *F41G 7/2253* (2013.01); *F41G 7/2286* (2013.01); *F41G 7/2293* (2013.01); *F41G 11/00* (2013.01); *F42B 5/025* (2013.01); *F42B 10/14* (2013.01); *F42B 12/58* (2013.01); *F42B 15/01* (2013.01);
(Continued)

(58) Field of Classification Search
CPC .......... B63C 9/01; B63C 9/08; B63C 9/0005; B63C 2009/0017; F42B 15/36
See application file for complete search history.

(56) References Cited

U.S. PATENT DOCUMENTS 4,305,143 A * 12/1981 Simms .................. H04B 11/00
340/573.6
4,702,715 A * 10/1987 Winick .................... B63C 9/08
441/30
(Continued)

*Primary Examiner* — Andrew Polay
(74) *Attorney, Agent, or Firm* — McLane Middleton, Professional Association

(57) ABSTRACT

A rescue system includes a wearable article, such as a wristband, which includes a radio frequency identification (RFID) tag, a radio frequency (RF) beacon, and a power supply. One or more RFID readers (collectively, an RF network) are located on a vessel, the RFID readers being configured to communicate with the RFID tag. Should the RF network detect a passenger overboard event, a modular rocket system is deployed. The modular rocket system comprises a guidance module, the guidance module including a guidance system for guiding the modular rocket system toward a target. A flight control module is removably attached to the guidance module, said flight control module including a plurality of airfoils. A flotation module is removably attached to the flight control module, said flotation module including a flotation device. A rocket motor module removably attached to the flotation module, said rocket motor module including a rocket motor configured to propel the modular rocket system.

27 Claims, 7 Drawing Sheets

(51) Int. Cl.
<table>
<tr><td>A44C 5/00</td><td>(2006.01)</td></tr>
<tr><td>G05D 1/10</td><td>(2006.01)</td></tr>
<tr><td>G01S 5/02</td><td>(2010.01)</td></tr>
<tr><td>B63C 9/01</td><td>(2006.01)</td></tr>
<tr><td>F41G 7/00</td><td>(2006.01)</td></tr>
<tr><td>F41G 7/22</td><td>(2006.01)</td></tr>
<tr><td>G01S 3/02</td><td>(2006.01)</td></tr>
<tr><td>G01S 17/88</td><td>(2006.01)</td></tr>
<tr><td>F42B 5/02</td><td>(2006.01)</td></tr>
<tr><td>G01S 3/78</td><td>(2006.01)</td></tr>
<tr><td>F42B 12/58</td><td>(2006.01)</td></tr>
<tr><td>F42B 10/14</td><td>(2006.01)</td></tr>
<tr><td>F42B 15/01</td><td>(2006.01)</td></tr>
<tr><td>G01S 13/88</td><td>(2006.01)</td></tr>
<tr><td>F41G 11/00</td><td>(2006.01)</td></tr>
<tr><td>F42B 15/08</td><td>(2006.01)</td></tr>
<tr><td>G01S 13/76</td><td>(2006.01)</td></tr>
<tr><td>G05D 1/12</td><td>(2006.01)</td></tr>
<tr><td>G01S 13/937</td><td>(2020.01)</td></tr>
</table>

(52) U.S. Cl.
CPC ............... *F42B 15/08* (2013.01); *G01S 3/02* (2013.01); *G01S 3/78* (2013.01); *G01S 5/0205* (2013.01); *G01S 5/0231* (2013.01); *G01S 13/765* (2013.01); *G01S 13/88* (2013.01); *G01S 17/88* (2013.01); *G05D 1/107* (2013.01); *G05D 1/12* (2013.01); *G01S 13/937* (2020.01)

(56) References Cited

U.S. PATENT DOCUMENTS

<table>
<tr><td>9,194,678 B2</td><td>11/2015</td><td>Teetzel et al.</td><td></td></tr>
<tr><td>9,964,386 B2</td><td>5/2018</td><td>Teetzel</td><td></td></tr>
<tr><td>2016/0046356 A1*</td><td>2/2016</td><td>Minecci</td><td>B63C 9/26<br>440/44</td></tr>
<tr><td>2016/0340006 A1*</td><td>11/2016</td><td>Tang</td><td>B63C 9/01</td></tr>
<tr><td>2018/0283828 A1</td><td>10/2018</td><td>Teetzel et al.</td><td></td></tr>
</table>

* cited by examiner

ASSEMBLED
40mm DESIGN FOR USE WITH LAUNCH SYSTEM

DEPLOYED IN FLIGHT
FLIGHT CONTROLLED SYSTEM FOR GUIDANCE TO STRANDED PERSON

SEEKER & GUIDANCE HEAD A
FLIGHT CONTROL B
FLOATATION & STROBE/RF BEACON C
ROCKET MOTOR D
SHELL CASING E
MODULAR SECTIONS MAKES FOR EASY MAINTENANCE

MODULAR ROCKET RESCUE SYSTEM AND PASSENGER SAFETY WEARABLE BAND

CROSS-REFERENCE TO RELATED APPLICATION

This application claims the priority benefit of U.S. provisional application No. 62/480,761 filed Apr. 3, 2017. The aforementioned provisional application is incorporated herein by reference in its entirety.

BACKGROUND

The present disclosure relates to a safety wearable article, preferably a wristband, and rescue system employing the same for persons travelling on a boat and, in particular, to a system and method of detecting a passenger overboard event and deploying a rescue device to a person who has fallen overboard. While the present development will be described herein primarily by way of reference to a system adapted for use on a cruise ship or similar vessel, it will be recognized that the present development is also amenable to all manner of marine vessels, including military vessels, war ships, cargo vessels, oil tankers, ferry boats, yachts, etc.

On occasion, persons travelling on a cruise ship or other vessel can fall overboard (referred to herein as a "passenger overboard" or "man overboard" event), whether accidentally or otherwise. Because witnesses are not always present to report a passenger overboard event, a number of systems have been proposed to detect passenger overboard events, including RFID systems, optical systems, and camera-based imaging systems. The common practice when a man overboard event occurs is to turn the vessel around and attempt to locate the person in the water. However, even in cases where a passenger overboard event can be detected with minimal delay, the vessel continues to travel away from the overboard person for period of time. Even if the point at which a man overboard event occurs is precisely known, movement of the water due to waves, the wake of the vessel, and currents can sweep the passenger a distance away from the point at which the man overboard event occurred. In this manner, both movement of the ship and movement of the water can serve to create a relatively large distance between the overboard passenger and the vessel in a relatively short period of time, thereby decreasing the chances of executing a successful search and rescue operation.

The present development provides a wearable band and associated rescue system which automatically detects a passenger overboard event and automatically dispatches a rescue device to the overboard passenger using a guided rocket system.

SUMMARY

In one aspect, a rescue system comprises a wearable article, such as a wristband, which includes a radio frequency identification (RFID) tag, a radio frequency (RF) beacon, and a power supply. One or more RFID readers (collectively, an RF network) are located on a vessel, the RFID readers being configured to communicate with the RFID tag. Should the RF network detect a passenger overboard event, a modular rocket system is deployed. The modular rocket system comprises a guidance module, the guidance module including a guidance system for guiding the modular rocket system toward a target. A flight control module is removably attached to the guidance module and includes a plurality of airfoils. A flotation module is removably attached to the flight control module and includes a flotation safety device. A rocket motor module is removably attached to the flotation module and includes a rocket motor configured to propel the modular rocket system.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Referring now to FIGS. 1-5, there appears an exemplary system operable to embody the overboard passenger detection and rescue system in accordance with this disclosure. For purposes of this disclosure, unless specifically stated otherwise, the terms "rocket" and "missile" are used interchangeably without regard to nuances in meaning.

Figure 5:
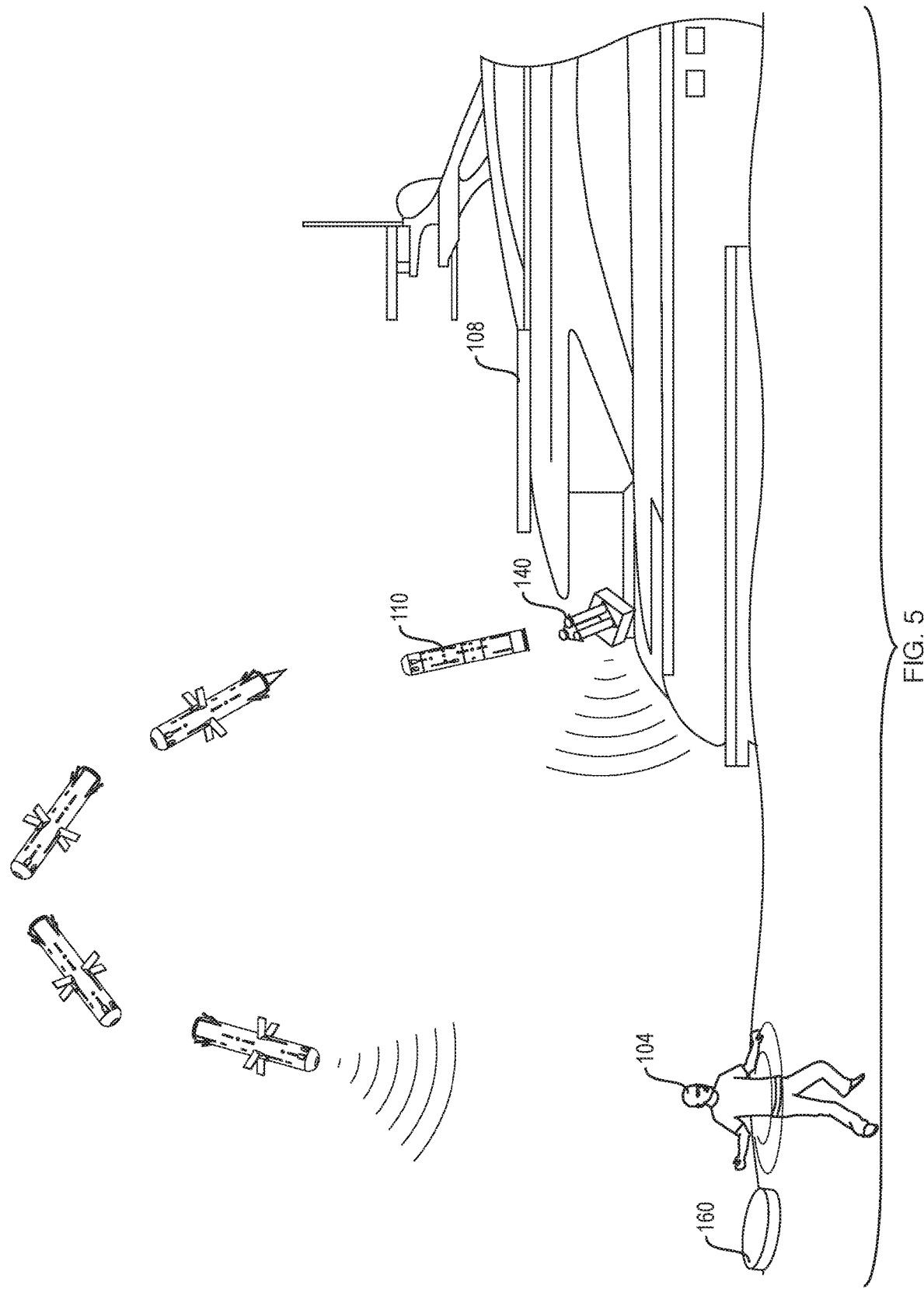
FIG. 5 illustrates an exemplary launch path of the modular rocket system herein.

A wearable band 10 includes a strap 14 configured to be worn around a body part of the passenger 104 (see FIG. 5). The wearable band 10 is preferably a wristband and will be described primarily herein by way of reference to the preferred embodiment, although it will be recognized that the wearable band 10 may also be configured to be worn around another body part such as an ankle band, and so forth. In certain embodiments, each passenger and each vessel crewmember receives a wristband.

The band 10 may further include a fastener for securing the band around the passenger's wrist/body part. In certain embodiments, the fastener is designed to be removed with a special key or tool, e.g., by cruise ship personnel, to prevent removal by the passenger for the duration of the cruise.

Figure 1:
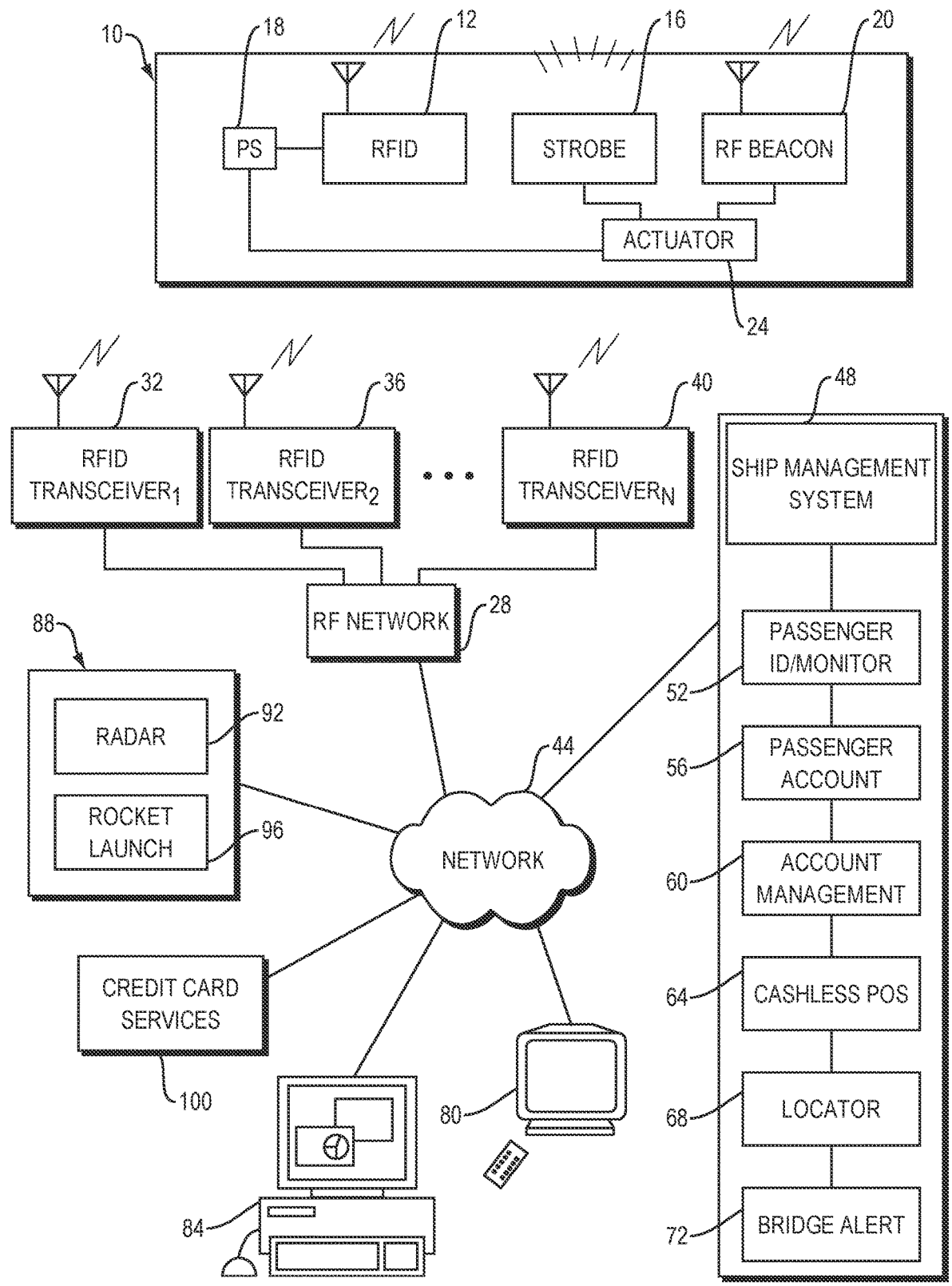
FIG. 1 is a simplified block diagram showing an exemplary data network for use of a wearable band according to some embodiments.
Figure 2A:
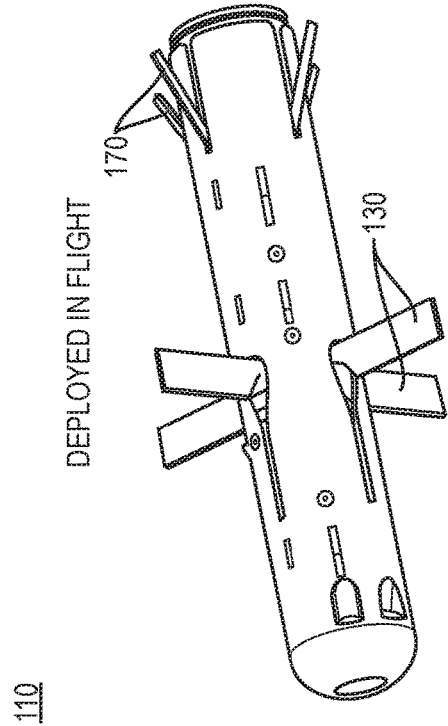
FIG. 2A is an isometric view of a modular rocket system in accordance with an exemplary embodiment of the present disclosure, wherein the wings appear in the retracted position.
Figure 2B:
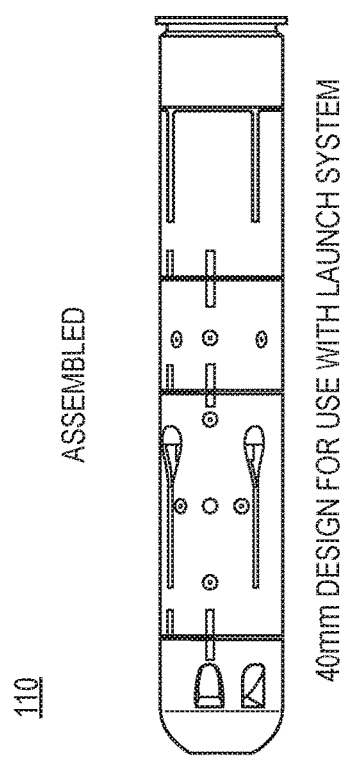
FIG. 2B, is an isometric view of the modular rocket system of FIG. 2A, wherein the wings appear in the extended position.
Figure 2C:
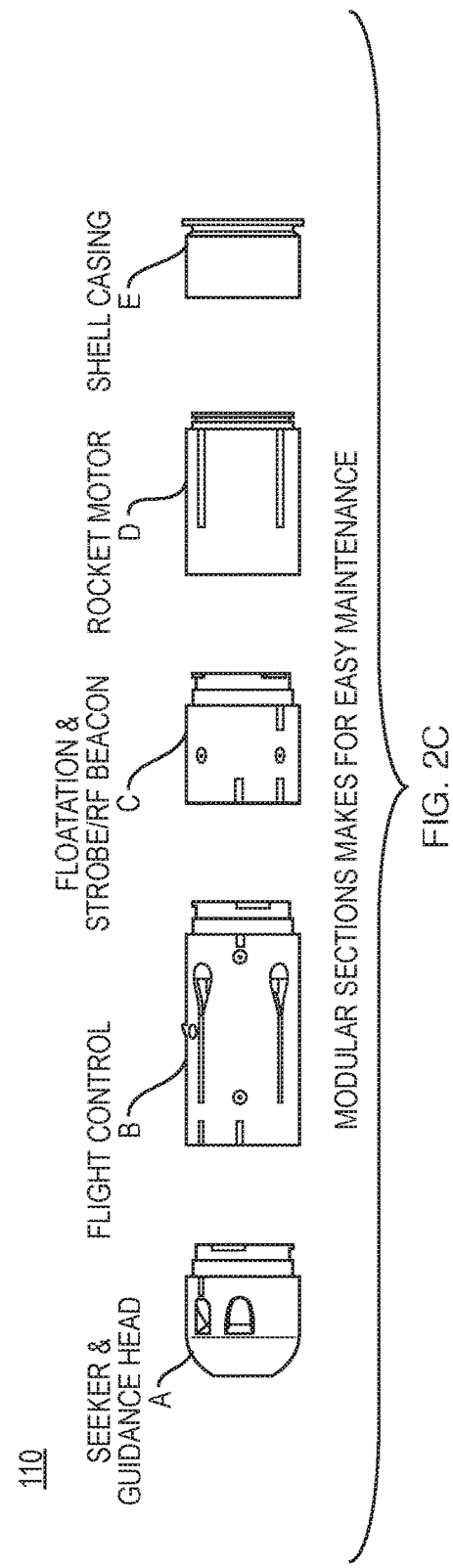
FIG. 2C is an exploded view of the modular rocket system of FIG. 2A.
Figure 3C:
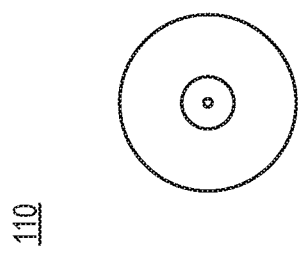
FIG. 3C is a rear view of the embodiment appearing in FIG. 2A.
Figure 3B:
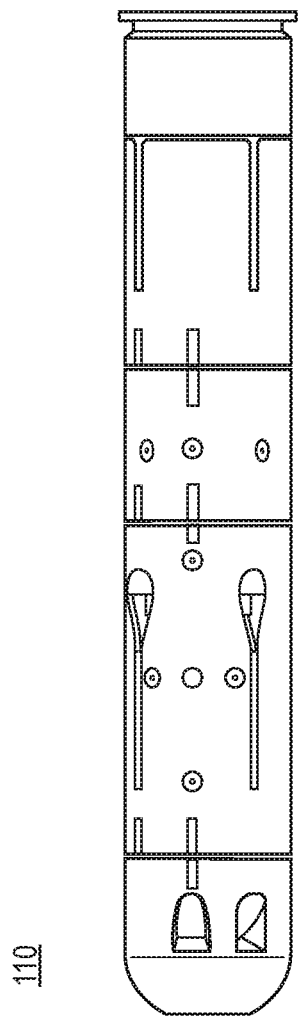
FIG. 3B is a side view of the embodiment appearing in FIG. 2A.
Figure 3A:
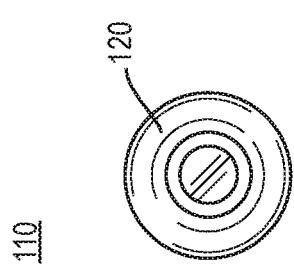
FIG. 3A is a front view of the embodiment appearing in FIG. 2A.
Figure 3D:
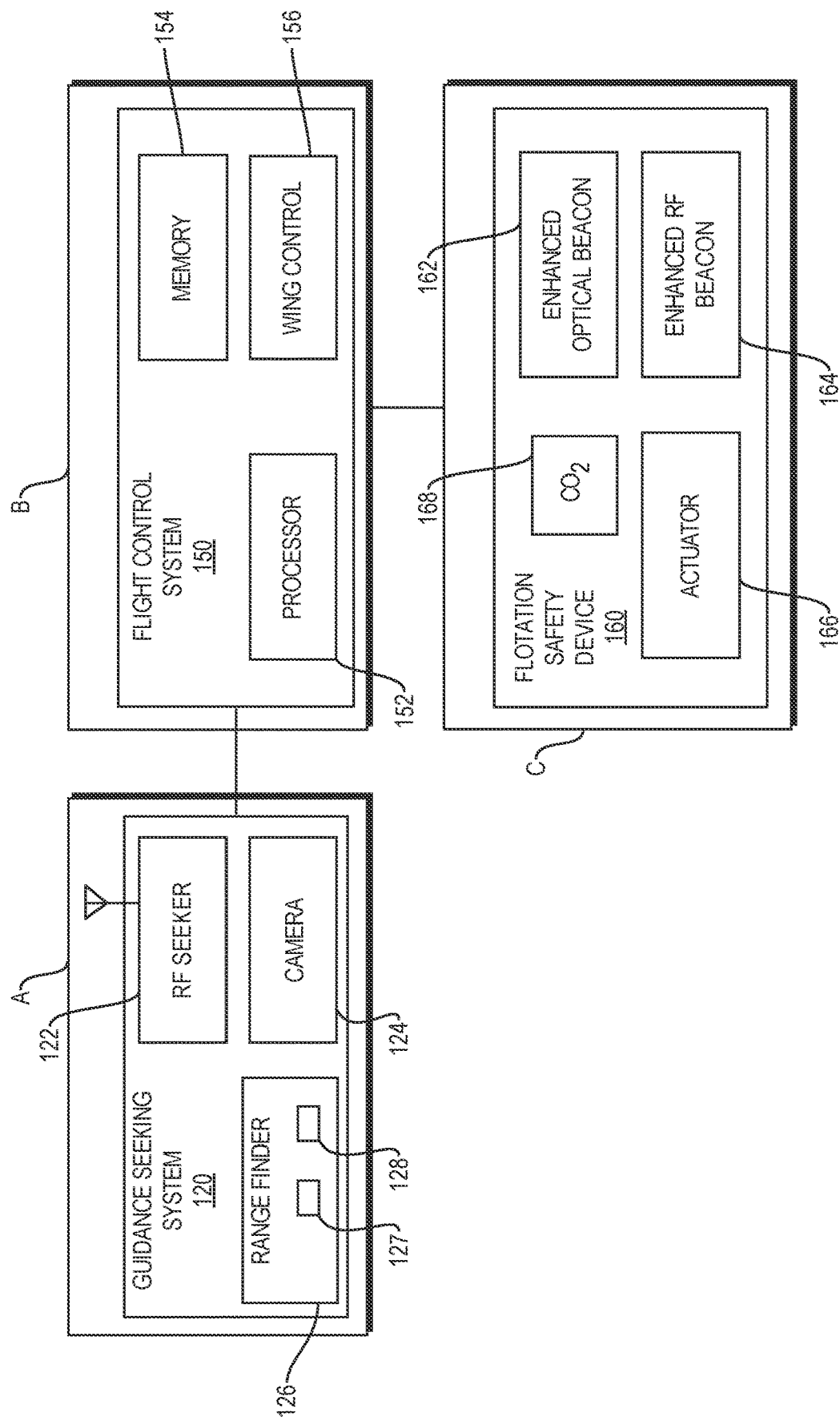
FIG. 3D is a simplified block diagram showing an exemplary relationship between a guidance module, a flight control module, and a flotation module of the modular rocket system herein.
Figure 4:
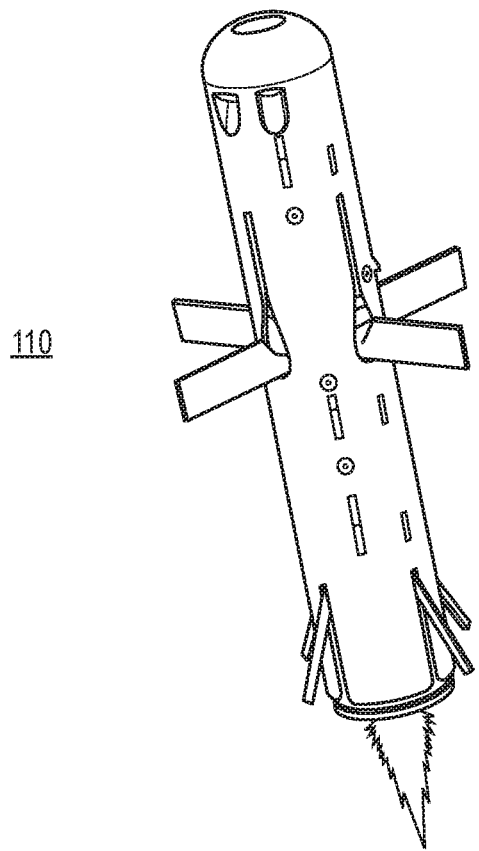
FIG. 4 illustrates the modular rocket system herein when the rocket motor is in operation.

As illustrated in FIG. 1, the wristband includes a power supply 18, an RFID tag or chip 12, a strobe light 16, a radio frequency (RF) beacon 20, and an actuator 24. The components are housed in an outer housing 14, such as a water-resistant or waterproof, e.g., polymeric, housing, to protect the components from exposure to water in the event of an overboard event or during showering, swimming, other recreational activities during the trip. In certain embodiments, the wristband may be color coded or imprinted with other indicia to indicate certain information, such as age of the wearer, e.g., to indicate whether the passenger is a minor. Other color codes/indicia may be provided to distinguish cruise ship personnel from passengers, indicate travel or cabin class, and so forth.

The power supply 18 may be a battery or battery pack for powering the electrical components of the wristband. In certain embodiments, power supply 18 is a rechargeable battery, which can be charged at the beginning of a cruise and recharged after it is turned in at the end of the cruise so that it will be fully charged and ready to be assigned to another passenger for the next cruise. Alternatively, a replaceable, non-rechargeable power supply is contemplated, e.g., wherein a fresh battery is provided at the beginning of each cruise, or after some specified number of uses. In still further embodiments, it is contemplated that the passenger is allowed to keep the wristband. For example, a disposable or non-reusable wristband is contemplated wherein the passenger may keep the wristband as a memento of the trip. In such instances, allowing passengers to take the wristband home as a memento provides an opportunity to sell more systems. In certain embodiments wherein the passenger is allowed to keep the wristband after the trip, it is contemplated that the wristband could be used at other events, including future cruises, or even at other events and facilities, including theme parks, festivals, etc., which use RFID for admission, tracking, cashless purchases, and so forth.

The wristband 10 includes a radio frequency identification (RFID) tag or chip 12 within the housing 14 configured for communicating with RFID readers 32, 34, 36, which may be disposed at various locations on the vessel 108 (see FIG. 5). The RF tag 12 may be active, semi-active, or passive. The RF tag 12 and RFID readers are capable of sending and receiving electromagnetic signals to and from each other. The RFID readers may be a part of an RF network 28 of the vessel, thereby allowing the wristband 10 to be wirelessly coupled to the RF network.

While embodiments employing a passive RF tag 12 are contemplated, a passive RF tag may not be suitable for initiating communications with the RFID reader, but must be read by the readers, i.e., wherein the RF tag 12 is powered by the RF waves transmitted by the RF reader for reading the RF tag 12. However, because a power supply 18 is provided to supply electrical power to the optical beacon 16 and the RF beacon 20, an active RF tag 12 is preferred.

In certain embodiments (not illustrated), the wristband may include a first, passive RF tag which is used in connection with passenger identification, monitoring, location, financial transaction, and so forth on board the vessel, and a second, active, long range RF transponder which is capable of transmitting a signal representative of a man overboard event in the event the RF tag is actuated by the actuator 24 upon the user falling overboard, as will be described in greater detail below.

The RF tag 12 stores information that is read by the RF readers, including a unique identifier for each passenger and crewmember on board the vessel. In certain embodiments, RF readers having a plurality of communication ranges are contemplated. For example, certain ones of the RF readers, which may include up to "N" RF readers where N is any integer, may have a short communication range. Exemplary short range RF readers may include any RF reader that operates as a proximity token RF, such as RF readers associated with a point of sale, such as a cashless point of sale 64, or a RF reader which is used to provide access to the passenger's cabin, a particular location or attraction on the vessel, or an interactive feature on the vessel such as a computer system or kiosk 84 at a location on the vessel which the passenger may use to manage his or her account.

Likewise, certain ones of the RF readers may have a relatively long communication range between the RF reader and the RF tag 12. Exemplary long-range readers may be, for example, used in connection with a passenger tracking and locator service 68 wherein the location of the passenger is monitored as he or she moves around the ship. Another long-range reader may be an RF reader located at the stern of the vessel for received a signal representative of a man overboard event.

In certain embodiments, one or more RF readers located at or near the stern of the vessel for receiving signals representative of a man overboard event are ones of the "N" RF readers on the RF network 28. Alternatively, one or more RF readers may be provided at or near the stern of the vessel for receiving signals representative of a man overboard event may be dedicated RF readers associated with the integrated stern launch and radar system 88, as will be described in greater detail below. In certain embodiments, the one or more RF readers located at or near the stern of the vessel may include at least one RF reader on the port side of the vessel and at least one RF reader on the starboard side of the vessel. The RF readers used to read information from a wristband of an overboard passenger should have sufficient range to communicate with the RF tag worn person in the water. In certain embodiments, the actuator 24 may, upon detecting an overboard event, activate circuitry in the wristband to increase the output signal strength of the RF tag 12.

The strobe/optical beacon 16 and the RF beacon 20 are activated by the actuator 24 when a man overboard evert occurs. In certain embodiments, the strobe/light beacon 16 is a high visibility light source. In certain embodiments, the RF beacon is an RF transmitter that emits an RF signal, which can be of the type/frequency that is received by direction finding equipment, such as an RF receiver with a directional antenna or other electronic seeking or homing equipment.

In certain embodiments, e.g., for vessels wherein passengers are not expected to get wet on board the vessel, the actuator may include a water sensor or actuator, wherein the strobe and RF beacon circuits in the wristband are activated when the wristband senses or comes into contact with water. In certain embodiments, e.g., for vessels wherein passengers may come into contact with fresh water on board the vessel but are not expected to come into contact with saltwater, the actuator may include a saltwater sensor or actuator, wherein the strobe and RF beacon circuits in the wrist band are activated when the wrist band senses or comes into contact with saltwater.

Since many cruise ships feature saltwater swimming pools, in certain embodiments, e.g., for vessels wherein passengers would be expected come into contact with saltwater, wherein actuator may include a sensor in addition to or as an alternative to a saltwater sensor for detecting a man overboard event. For example, the actuator may include a sensor for sensing a vertical drop that is greater than some predetermined threshold. Such sensors may include an altimeter (e.g., digital barometric pressure sensor or the like) or an accelerometer (e.g., a digital three-axis digital accelerometer) for sensing a human fall from a height. Other sensor types may include shock or impact sensors that detect sudden impacts and indicate whether the level exceeds some predetermined level associated with a human fall into water from a height.

In certain embodiments, to prevent false alerts, the actuator includes a water sensor or salt-water sensor in combination with an additional sensor such as an altimeter, accelerometer, to shock or impact sensor configured to sense a human fall.

The RF network 28 is coupled to a network 44, which includes a local area network (LAN), intranet, or the like of the vessels, and any interconnections thereof with other networks. The network 44 may include a Wi-Fi network as well as connections to other networks and gateways, such as a satellite telecommunications network (data and voice) and the Internet.

A ship management system 48 is connected to the network 44. The ship management system includes a passenger identification and monitoring service 52, a passenger account module 56, a passenger account management service 60, a cashless payment service 64, a locator service 68, and a bridge alert service 72. The services included in the ship management system 48 are illustrative and exemplary only and other services may be provided by the ship management system 48.

The passenger identification and monitoring service 52 identifies passengers as they board and de-board the vessel to maintain an accurate inventory or log of passengers on board the vessel. The RF tag 12 may be read by RFID reader(s) located at the boarding point(s) to identify passengers as they board and exit the vessel in lieu of a passenger ID card. The passenger identification and monitoring service 52 may include a database of digital photographs of each passenger or other biometric data. The photographs may be used to identify passengers as they board the vessel. In certain embodiments, the RF reader reads the passenger ID information and displays the stored photograph of the passenger on a display screen for visual verification by vessel personnel. In certain embodiments, the passenger identification and monitoring service 52 may use a camera and facial recognition software for passenger identification before the passenger is being allowed to board. Alternatively, the passenger identification and monitoring service 52 may use a biometric sensor and pre-stored passenger biometric data for passenger identification before the passenger is being allowed to board. The passenger account module 56 allows a passenger to pre-pay fees and/or pre-enroll for onboard events and services for him or her and family members, and provide credit card account information and authorization. In certain embodiments, passenger account module 56 manager communicates a credit card services module 100 to pre-authorize spending levels for the passenger and family members, and for authorizing and billing credit card transactions made during the trip.

An account management system 60 monitors the activities and spending of the passenger and family members or other group of passengers to be linked together. The account management system 60 may also restrict access and spending authorizations according to predetermined parameters. For example, the account management system 60 allows parents to establish access and spending limits for their children, block alcohols sales or certain television programming to their children, and the like. In certain embodiments, a passenger interface 80, such as an in-cabin television may be provided to allow the passenger to access the account management system 60 for updating account information and authorizations. For example, the television may use an interactive application running on a set top box associated with the television or other processing electronics such as a "smart TV" processing system which may be navigated with a remote control unit. Similarly, in certain embodiments the account management system 56 may include one or more computer-based kiosks at one or more locations on the vessel to allow the user to access and update account information. In certain embodiments, not shown, the network 44 may include one or more Wi-Fi hot spots wherein the user to access and update account information using an application running on a computer based system such as a laptop, smart phone, or tablet.

The cashless point of sale system 64 is in communication with the RF network 44 and provides passengers with a secure, cashless system for paying for goods and services at different points of sale on the vessel. The RF tag 12 in the wristband 10 communicates with a point of sale terminal to identifying the passenger making a purchase. The ship management system 48 confirms that the purchase is authorized as per the account management settings in the account management system 60, and if permitted, the transaction is performed and the purchase is charged against the passenger account 56 account. The cashless point of sale system 64 also logs spending activity and transaction information of the passenger and any family or group members to the passenger account 56.

A locator service 68 uses the RF network 44 to provide a tracking or locating function to help locate a passenger onboard the vessel. For example, the locator service 68 may provide a verification that a child remains at a permissible location on the ship. On board tracking provided by the locator service 68 may also be used to better manage the customers. For example, by knowing where the passengers are at all times, the cruise ship operators can direct more staffing to a busy area.

In certain embodiments, an RF tag 12 in passenger wristbands 10 are queried by the RF network at periodic intervals to provide a passenger tracking function. In certain embodiments, the RF network can query a particular passenger's wristband to determine the location of that passenger on the vessel. In certain embodiments, a person may be located using the interactive television 80 or the computer system 84. The account management system 60 allows passengers specify which other passengers are authorized to access their location using the locator system 68.

The bridge alert service 72 is provided to alert the captain and crew members to a man overboard event so that the vessel can stop and/or return to the point at which the passenger overboard event occurred and appropriate search and rescue procedures can be implemented, including deploying the guided rocket rescue system as described below.

Referring now to FIGS. 2-5, there appears an exemplary modular rocket system 110, which includes a seeker and guidance head or nose module A, a flight control module B, a flotation and strobe/RF beacon module C, a rocket motor module D, and a cartridge shell E.

The nose module A includes a generally tapered outer shell construction 112 shaped to minimize aerodynamic resistance. The nose module A includes an interior cavity or compartment housing a search and seeker guidance system 120. The seeker and guidance system 120 may include one or both of an RF seeking receiver or transceiver 122 and an optical camera 124. In certain embodiments, in operation, the camera system 124 helps pinpoint location of person as the camera arches over to image a field of view of the area. In certain embodiments, the missile climbs to a relatively high altitude to image a large field of view and detect the contrast between the water and the overboard passenger, wherein the optical beacon serves to increase the optical contrast. In certain embodiments, the altitude at which the rocket arches over is approximately 1,000-5,000 feet, preferably about 2,000-4,000 feet, and most preferably about 3,000 feet above the launch point.

The search and seeker guidance system cooperates with flight control programming stored in processing electronics and an associated memory within the flight control module B to guide the rocket system 110 toward the overboard passenger 104.

In certain embodiments, the seeker guidance system 120 includes the RF search and seeker guidance system 122 for sensing the RF beacon emitted by the RF beacon 20 in the wristband 10. The RF seeker guidance system cooperates with flight control programming stored in processing electronics and an associated memory within the flight control module B to guide the rocket system 110 toward the RF beacon 20.

In certain embodiments, the seeker guidance system 120 includes the optical imaging module 122 for sensing light emitted by the strobe 16 on the wristband 10. The optical imaging module images the field of view in front of the missile and cooperates with flight control programming stored in processing electronics and an associated memory within the flight control module B to steer the rocket system 110 toward the strobe 16 by maintaining the imaged light source within the imaged field of view.

In certain embodiments, the seeker guidance system includes both the RF seeker guidance system for sensing and guiding the rocket toward the RF beacon 20 and an optical seeker guidance system for sensing and guiding the rocket toward the strobe 116 as detailed above.

In certain embodiments, the nose module further includes a laser range finder module 126 which includes a laser 127 and an optical sensor 128. The laser 127 sends a beam toward a target such as the overboard person or the surface of the water, and reflections of the beam are detected by the optical receiver 128. The distance to the target is calculated based on the time-of-flight of the laser beam. In certain embodiments, the laser 22 emits a laser beam in a very short series of pulses, which may be encoded to assist the detector in recognizing the reflected signal.

The flight control module B includes a generally cylindrical outer shell receiving a plurality of airfoils or wings 130 circumferentially spaced about the flight control module C. The wings 130 can be folded into receptacles in the body of the flight control module C to allow the assembled system 110 to fit into a missile launch system 140, which may be provided at the stern of the vessel and will be described in greater detail below. In certain embodiments, the missile diameter is 40 mm and is configured to be fired from existing 40 mm launch platforms, although in certain embodiments other sizes and/or custom or dedicated firing platforms are also contemplated. The flight control module C contains processing electronics which receive signals from the search and guidance system 120 to steer the missile 110 toward the strobe and/or RF beacon of the wrist band worn by the overboard passenger.

In certain embodiments, the flight control module B includes a flight control system 150 comprising a processor 152, an associated electronic memory 152 operably coupled thereto for storage and execution of flight control instructions or algorithms, responsive to signals or instructions from the search and seeker guidance system. The flight control system 150 further comprises a wing controller 154 for controlling the wings under programmed control of the processor 152 responsive to signals input from the seeking guidance system 120.

After one of the rockets 110 is fired from the launch platform 140, the wings 130 can be moved to their extended position. In certain embodiments, each of the wings 130 is independently controllable and may be rotated or tilted as ailerons to provide maneuverability/steering control as well as stability of the sensing system during flight. The wings 130 are small enough to fit within the housing shell to allow the system 110 to fit within the constraints of the launching platform while providing the ability to allow the system 110 to perform banking and turning maneuvers during flight. In certain embodiments, the wings are large enough to steer the rocket system 110 around obstacles during flight. Additionally or alternatively, the system 110 may be maneuvered by a conventional thrust vector control system, e.g., of the type using a gimbaled booster nozzle to steer the weapon. The wings 130 may be actuated and controlled via springs, hydraulics, pneumatics, motors, and so forth under programmed control responsive to the input of the search and seeker guidance system to maintain the path of the rocket 110 toward the RF beacon and/or strobe beacon emitted from the wristband 10.

The flotation module C includes an outer shell housing containing an inflatable flotation safety device 160. In certain embodiments, the module C is configured to activate to inflate and release the inflatable bladder in the presence of water. In certain embodiments, the module C is configured to activate to inflate and release the inflatable bladder in the presence of salt water. Inflation and release of the inflatable bladder in the presence of water or salt water may occur via any of a variety of methods including sensing electronics, chemical reaction or sensing, or physical reaction (e.g., dissolution), and so forth.

In certain embodiments, to prevent the missile from injuring the overboard passenger when it lands in the water, the flotation device 160 includes an actuator 166 for triggering inflation of the flotation device before the missile hits the water. In certain embodiments, the actuator is operable coupled to the range finder, e.g., via the processor 152, and is configured to trigger the release and inflation of the flotation device when the rocket 110 is within some predetermined distance away from the water. In preferred embodiments, the predetermined distance is 15 meters, although other distances are contemplated. In certain embodiments, the range finder 126 monitors the distance of the rocket 110 from the surface of the water and sends data representative of the sensed distance to the processor 152. When the threshold distance (e.g., 15 m) is reached, the processor 152 controls the actuator 152 to actuate inflation of the flotation device 160.

In certain embodiments, a water or salt-water actuator is provided as a backup actuator to cause the flotation device to inflate as a last resort, e.g., in the event the flotation device fails to properly deploy at the predetermined height responsive to the optical range finder.

In certain embodiments, the flotation safety device 160 may be an inflatable vest or other garment, ring, belt, raft, and so forth to provide buoyancy to the overboard passenger when grasped or worn. The inflatable flotation safety device includes a source of compressed gas, such as a $CO_2$ cartridge 168. In certain embodiments, the inflatable flotation safety device includes a $CO_2$ canister attached to an inlet of the inflatable flotation safety device, wherein a valve operable by the actuator 166 to provide a fluid coupling between the $CO_2$ gas and the flotation safety device.

In certain embodiments, the inflatable flotation safety device includes a $CO_2$ canister attached to an inlet of the inflatable flotation safety device, wherein a spring powered pin is provided to pierce the outlet of the $CO_2$ canister, and wherein a dissolvable bobbin retains the spring/pin in the retracted position until it comes into contact with water and the bobbin is dissolved.

In certain embodiments, an oral inflation valve is provided on the flotation device to allow the user to manually inflate the flotation device using his or her breath, e.g., in the event the $CO_2$ cartridge fails to inflate (or to inflate fully) the flotation device or in the event gas leaks from the device after being inflated by the $CO_2$ cartridge.

In certain embodiments, the flotation safety device is formed of or coated with a high visibility material to further enhance search and rescue efforts conducted during daylight hours. In certain embodiments, the flotation safety device coated with a highly radar-reflective material to further assist in detecting the overboard passenger using the radar system 92 or other radar system, such as a radar system of the overboard passenger's vessel or other rescue vessel or vehicle. In certain embodiments, the flotation safety device coated with a highly light-reflective (e.g., retro-reflective) material to further assist in detecting the overboard passenger using a search light.

In certain embodiments, the flotation safety device includes a second RF beacon 164. In certain embodiments, the second RF beacon may have an extended run time relative to the RF beacon 20 in the wristband. In certain embodiments, the second RF beacon 164 has an increased power, e.g., to provide extended transmission range relative to the RF beacon 20 in the wristband.

In certain embodiments, the flotation safety device includes a second optical beacon/strobe 162. In certain embodiments, the second optical beacon 162 may have an extended run time relative to the optical beacon 16 in the wristband. In certain embodiments, the second optical beacon 162 has an increased brightness/intensity to provide increased visibility relative to the optical beacon 20 in the wristband.

In certain embodiments, the first and second RF beacons in the wristband and/or flotation device include a radio transmitter broadcasting a radio signal that can be detected by a directional antenna. In certain embodiments, the first and second RF beacons each include an RF transponder that communicates with a seeking transponder system for locating the beacon device. In an exemplary embodiment, the beacon device, upon deployment of the flotation device, sends out an identification signal. The seeking transponder then responds by querying the beacon device, e.g., as to direction, location, distance or the like. The beacon device then responds to this query with the requested information.

In certain embodiments, the RF beacon 20 in the wristband is a radio transmitter broadcasting a radio signal that can be detected by a directional antenna and the second RF beacon in the flotation device is an enhanced RF beacon includes an RF transponder that provides for two-way communication with a seeking transponder system.

The rocket booster module D includes an outer shell housing defining a rocket motor configured with a rocket-based propulsion system as would be generally known in the art. The rocket motor may be powered by any suitable rocket fuel in any suitable form, including solid, liquid, gel, or any combination thereof. In certain embodiments, a plurality of retractable air vanes or fins 170 (e.g., spring biased) are folded into receptacles in the rocket booster module housing and are extended for stability during flight. In certain embodiments or configurations, the rocket module D may be provided with fixed vanes or fins.

Figure 6:
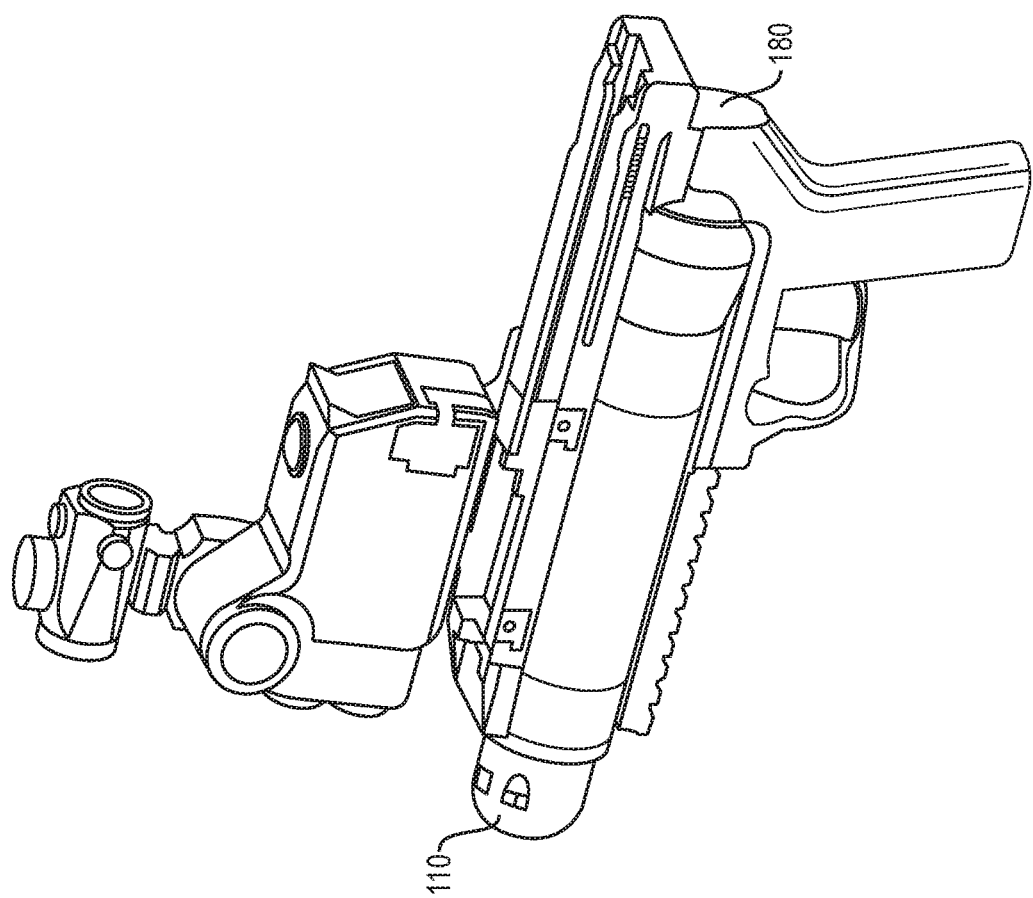
FIG. 6 illustrates an exemplary launch device for the modular rocket system herein.

In certain embodiments, the rocket system 110 may be configured to be fired from a multiple tube (e.g., tri-tube) launch platform 140. However, in certain embodiments, it is contemplated that the rocket system could be fired from a handheld launch platform such as a grenade launcher 180, e.g., a single shot 40 mm grenade launcher, as shown in FIG. 6.

The rearward end of the motor module D is received within shell casing or cartridge E, which may be a 40 mm shell casing. The shell casing E includes a charge of explosive material to propel the rocket system 110 out of the launch tube of the launch platform. In certain embodiments, the charge may be relatively small since it is only necessary to launch the rocket system 110 a sufficient distance away from the operator and vessel to safely fire the rocket motor D.

The housing shells, wings, vanes, etc., of the present system may be formed of a metal or metal alloy material or a composite material comprising a fiber reinforced polymer material as are known in the aerospace industry.

The rear portion of the module A is connected to the front portion of the flight control module B via complimentary fasteners. Likewise, the rear portion of the module B is connected to the front portion of the flotation module C via complimentary fasteners. Similarly, the rear portion of the module C is connected to the front portion of the rocket module D via complimentary fasteners. The modular design provides for ease of assembly and maintenance. In certain embodiments, the complimentary fasteners include cam lock mechanisms. Alternatively, the fasteners connecting the module A to B and module B to module C include bayonet type connectors. Electrical connectors and conductive pathways may be provided on the module housing sections to allow for power, signals and data to be transmitted between the electronics within the flight control module B and the nose module A. In certain embodiments, markings or indicia may be provided on adjacent modules to show proper alignment. The connectors may be keyed or otherwise configured to allow the modules to be connected only in the proper order.

In the event of a man overboard event, the actuator 24 activates the strobe beacon 16, e.g., upon the passenger entering the water. In addition, when an RF reader, i.e., an RF reader located at or near the stern of the vessel, reads the identification information from the RF tag 12 in the overboard passenger's wristband 10, the radar component 92 of the integrated radar and launch system is turned on. The radar system 92 may be any radar system of the type suitable for finding and determining the location small objects in the water.

If an overboard person is detected by the radar system, the bridge alert system 72 automatically alerts the captain and crew of the vessel that a man overboard event has occurred so that appropriate procedures can be implemented. The bridge alert system also alerts the captain and crewmembers as to the identity of the victim so that the victim's family or group members can be notified.

Also, if an overboard person is detected by the radar system, a missile 110 is launched by the launch system 96. The launch system 96 preferably includes a plurality of launch tubes and firing mechanism. In certain embodiments, the launch tube includes weather-tight or weather resistant covers which are operable to prevent moisture and environmental contamination from entering the tube without interfering with the ability to launch the missile 110. In certain embodiments, the launch tube covers are formed of a resilient elastomeric material with a plurality of cross slits defining a plurality of deflectable leaves or flaps.

In certain embodiments, if the radar system is turned on but fails to detect the location of a person in the rescue area, e.g., due to high waves or other reason, or the rocket fails to launch, or other scenario such as when there are eyewitness reports of a man overboard event, cruise ship personnel can manually initiate launching a rocket 110 using the ship management system 48.

In operation of the preferred embodiments, the shell casing E is actuated, e.g., by a firing pin, electronic signal, or the like, of the launch platform, to ignite a charge of gunpowder packed into the shell casing behind the rocket motor D. The shell casing propels the rocket 110 some distance away from the vessel, at which time the rocket motor D is activated. The motor brings the sensor to a height to canvas the rescue area for the RF beacon (in cases where an RF seeking guidance system is employed in the sensor module A) and/or the optical strobe (in cases where an optical seeking guidance system is employed in the sensor module A). In certain embodiments, the rocket is propelled to a height of about 3000 feet above sea level to scan the rescue area. The rocket 110 is then guided by the respective one or both of the optical and RF beacons, depending on the sensor(s) present in the sensor module A, under the program control of the flight control module, responsive to feedback from the sensor module A. In certain embodiments, the flight control module controls the flight path of the rocket 110 to aim for a point that is some reasonable distance away from the overboard passenger to avoid directly impacting the overboard passenger.

When the rocket 110 enters the water at a point near the overboard passenger, the flotation module C is activated and the flotation safety device is automatically inflated using the source of compressed gas. Likewise, the enhanced RF beacon and enhanced optical beacon associated with the flotation device are also actuated to assist searchers in locating the overboard passenger and rescuing the passenger from the water.

All numbers herein are assumed to be modified by the term "about," unless stated otherwise. The recitation of numerical ranges by endpoints includes all numbers subsumed within that range (e.g., 1 to 5 includes 1, 1.5, 2, 2.75, 3, 3.80, 4, and 5).

The invention has been described with reference to the preferred embodiments. Modifications and alterations will occur to others upon reading and understanding the preceding detailed description. It is intended that the invention be construed as including all such modifications and alterations insofar as they come within the scope of the appended claims and equivalents thereof.

What is claimed is:

1. A modular rocket system for locating a person overboard, comprising:
    a guidance module including a first housing shell defining an interior compartment receiving one or both of a radio frequency receiver for sensing a radio frequency rescue beacon and a camera for sensing an optical rescue beacon, the guidance module further including a first fastener;
    a flight control module removably coupled to the guidance module, the flight control module including a second housing shell receiving a plurality of airfoils, the flight control module cooperating with the guidance module to steer the modular rocket system toward one or both of the radio frequency rescue beacon and the optical rescue beacon, the flight control module further including a second fastener disposed at a first end of the second housing shell and a third fastener disposed at a second end of the second housing shell opposite the first end, the second fastener removably coupled to the first fastener;
    a flotation module removably coupled to the flight control module, the flotation module including a third housing shell receiving a flotation safety device, a fourth fastener disposed at a first end of the third housing shell, and a fifth fastener disposed at a second end of the third housing shell opposite the first end, the fourth fastener removably coupled to the third fastener; and
    a rocket motor module removably coupled to the flotation module, the rocket motor module including a fourth housing shell receiving a rocket motor configured to propel the modular rocket system, the rocket motor module further including a sixth fastener disposed at a first end of the fourth housing, the sixth fastener removably coupled to the fifth fastener.

2. The modular rocket system of claim 1, wherein one or both of the radio frequency rescue beacon and the optical rescue beacon is configured to be worn by the person.

3. The modular rocket system of claim 1, further comprising a wearable article having one or both of the radio frequency rescue beacon and the optical rescue beacon thereon.

4. The modular rocket system of claim 3, wherein the wearable article is a wristband.

5. The modular rocket system of claim 3, further comprising an actuator configured to actuate one or both of the radio frequency beacon and the optical rescue beacon responsive to the person falling overboard.

6. The modular rocket system of claim 5, wherein the actuator includes one or more sensors configured to detect any one or more of a presence of water, a presence of a chemical composition, a presence of salt water, a rate of acceleration of the wearable article, a change in altitude of the wearable article, and an occurrence of an impact event.

7. The modular rocket system of claim 3, wherein the wearable article includes a radio frequency identification tag programmed to store user identification information and configured for communicating with an RFID reader.

8. The modular rocket system of claim 1, wherein the guidance module includes an optical range finder for determining a distance between the modular rocket system and the person.

9. The modular rocket system of claim 1, wherein the rocket motor is configured to propel the modular rocket system to a predetermined altitude to canvas a rescue area for the person.

10. The modular rocket system of claim 9, wherein the predetermined altitude is approximately 3,000 feet.

11. The modular rocket system of claim 1, wherein the flotation module further comprises one or both of an enhanced optical rescue beacon and an enhanced radio frequency rescue beacon.

12. The modular rocket system of claim 11, wherein the flotation module includes an actuator for actuating one or both of the enhanced optical rescue beacon and the enhanced radio frequency rescue beacon.

13. The modular rocket system of claim 1, wherein the flotation module includes an inflatable bladder and a source of compressed gas for inflating the inflatable bladder.

14. The modular rocket system of claim 13, further comprising an actuator configured to deploy the flotation safety device.

15. The modular rocket system of claim 14, wherein the guidance module further comprises an optical range finder for determining a distance to the person, the actuator configured to deploy the flotation safety device when the modular rocket system is a predetermined distance from the person.

16. The modular rocket system of claim 14, wherein the actuator is configured to deploy the flotation safety device in the presence of water.

17. The modular rocket system of claim 14, wherein the actuator is a mechanical actuator for fluidically coupling the source of compressed gas to the inflatable bladder.

18. The modular rocket system of claim 12, wherein the enhanced radio frequency rescue beacon is a radio frequency transponder configured to communicate with a seeking transponder system.

19. The modular rocket system of claim 1, wherein the flotation safety device is formed of a radar-reflective material.

20. The modular rocket system of claim 3, wherein the wearable article is configured to communicate with one or more data networks of a vessel.

21. The modular rocket system of claim 20, wherein the one or more data networks includes a vessel management system, a passenger identification and monitoring module, a passenger account module, a passenger account management module, a passenger payment module, a passenger locator module, and a bridge alert module.

22. The modular rocket system of claim 21, wherein the one or more data networks include a plurality of radio frequency identification readers being positioned at predetermined locations on the vessel, wherein said predetermined locations are encoded in the vessel management system.

23. The modular rocket system of claim 22, wherein the one or more data networks includes a central network, the central network communicatively coupled with the one or more radio frequency identification readers, the vessel management system, and the modular rocket system.

24. The modular rocket system of claim 1, wherein the modular rocket system further comprises a shell casing removably attached to the rocket module, said shell casing including a charge of explosive material.

25. The modular rocket system of claim 1, wherein the modular rocket system is configured to fit into a conventional launch platform from which the modular rocket system can be launched.

26. A rescue system comprising:
a wearable article, said wearable article further comprising a radio frequency identification tag, a first radio frequency beacon, a first actuator, and a power supply;
one or more radio frequency identification readers, said one or more radio frequency identification readers located on a vessel and configured to communicate with the radio frequency identification tag; and; and
a modular rocket system for locating a person overboard, said modular rocket system comprising a guidance module including a first housing shell defining an interior compartment receiving one or both of a radio frequency receiver for sensing a radio frequency rescue beacon and a camera for sensing an optical rescue beacon, the guidance module further including a first fastener, a flight control module removably coupled to the guidance module, the flight control module including a second housing shell receiving a plurality of airfoils, the flight control module cooperating with the guidance module to steer the modular rocket system toward one or both of the radio frequency rescue beacon and the optical rescue beacon, the flight control module further including a second fastener disposed at a first end of the second housing shell and a third fastener disposed at a second end of the second housing shell opposite the first end, the second fastener removably coupled to the first fastener, a flotation module removably coupled to the flight control module, the flotation module including a third housing shell receiving a flotation safety device, a fourth fastener disposed at a first end of the third housing shell, and a fifth fastener disposed at a second end of the third housing shell opposite the first end, the fourth fastener removably coupled to the third fastener, and a rocket motor module removably coupled to the flotation module, the rocket motor module including a fourth housing shell receiving a rocket motor configured to propel the modular rocket system, the rocket motor module further including a sixth fastener disposed at a first end of the fourth housing, the sixth fastener removably coupled to the fifth fastener.

27. A rescue device, comprising:
an article configured to be worn by a passenger on a marine vessel, the article including a radio frequency identification (RFID) tag configured to communicate with a radio frequency (RF) network on the marine vessel for detecting a man overboard event;
one or more rescue beacon devices selected from the group consisting of an RF beacon, an optical beacon, and a combination thereof;
a power supply operatively coupled to the one or more rescue beacon devices; and
an actuator configured to actuate the one or more rescue beacon devices responsive to the man overboard event.

* * * * *